United States Patent
Wang et al.

(10) Patent No.: US 10,814,406 B1
(45) Date of Patent: Oct. 27, 2020

(54) INTERNAL COOLING PASSAGES FOR ROTATING CUTTING TOOLS

(71) Applicant: United Technologies Corporation, Farmington, CT (US)

(72) Inventors: Zhigang Wang, South Windsor, CT (US); Changsheng Guo, South Windsor, CT (US); Robert W. Day, Enfield, CT (US); Gordon Miller Reed, Plantsville, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 16/392,999

(22) Filed: Apr. 24, 2019

(51) Int. Cl.
*B23B 51/06* (2006.01)
*B23C 5/28* (2006.01)

(52) U.S. Cl.
CPC ............... *B23B 51/06* (2013.01); *B23C 5/28* (2013.01); *B23B 2250/125* (2013.01); *B23B 2251/40* (2013.01); *B23C 2250/12* (2013.01); *Y10T 408/45* (2015.01); *Y10T 408/455* (2015.01); *Y10T 409/304032* (2015.01)

(58) Field of Classification Search
CPC ..... B23B 51/06; B23B 2250/125; B23C 5/28; B23C 2250/12; Y10T 408/45; Y10T 408/455; Y10T 409/304032
See application file for complete search history.

(56) References Cited

U.S. PATENT DOCUMENTS

| | | | | |
|---|---|---|---|---|
| 2,541,849 | A | * | 2/1951 | Villeneuve .............. B23B 51/06 76/108.6 |
| 3,555,935 | A | * | 1/1971 | Dorrenberg ........... B21C 23/085 76/108.6 |
| 7,134,813 | B2 | | 11/2006 | Kleiner |
| 8,621,964 | B2 | | 1/2014 | Filho et al. |
| 8,753,046 | B2 | | 6/2014 | Schneider et al. |
| 8,827,598 | B2 | | 9/2014 | Henry et al. |
| 9,180,650 | B2 | | 11/2015 | Fang et al. |
| 9,623,490 | B2 | * | 4/2017 | Takai ....................... B23B 51/06 |
| 9,636,756 | B2 | * | 5/2017 | Riester ................... B23B 51/06 |
| 9,895,755 | B2 | | 2/2018 | Kondameedi et al. |
| 10,201,862 | B2 | | 2/2019 | Kachler |

(Continued)

FOREIGN PATENT DOCUMENTS

| | | | | |
|---|---|---|---|---|
| DE | | 1627778 A1 * | 1/1975 | ........... B21C 23/085 |
| DE | 102014013210 A1 * | | 3/2016 | ............. B23B 51/06 |

(Continued)

*Primary Examiner* — Eric A. Gates
(74) *Attorney, Agent, or Firm* — Bachman & LaPointe, P.C.

(57) ABSTRACT

A cutting tool comprising a tool body comprising a shank and a cutter opposite the shank, the body defining a length from a shank end to an end face opposite the shank end, a central axis extends along the length of the body; at least one tooth having a cutting edge, the cutting edge extending along the tooth from the shank to the end face; a flute formed adjacent the at least one tooth; at least one cooling channel formed in the tooth proximate the at least one cutting edge, the at least one cooling channel having an elongated cross sectional shape with an elliptical portion and a circular portion opposite the elliptical portion, wherein the elliptical portion is located proximate the cutting edge.

19 Claims, 4 Drawing Sheets

(56) References Cited

U.S. PATENT DOCUMENTS

| | | | | |
|---|---|---|---|---|
| 2006/0006576 A1* | 1/2006 | Karos | ................... | B21C 23/147 |
| | | | | 264/209.2 |
| 2015/0030396 A1 | 1/2015 | Abe et al. | | |
| 2016/0207119 A1* | 7/2016 | Naruke | ................... | B23B 51/02 |
| 2017/0291229 A1* | 10/2017 | Genini | .................... | B23P 15/32 |
| 2018/0093330 A1* | 4/2018 | Guter | ........................ | B23C 5/28 |
| 2018/0326500 A1 | 11/2018 | Kaufmann et al. | | |
| 2018/0369976 A1 | 12/2018 | Gosselin et al. | | |

FOREIGN PATENT DOCUMENTS

| | | | | |
|---|---|---|---|---|
| EP | 2298480 A1 * | 3/2011 | ............... | B23C 5/28 |
| JP | 63216611 A * | 9/1988 | ............ | B23B 51/06 |
| JP | 2004154883 A * | 6/2004 | | |
| JP | 2011121173 A * | 6/2011 | ................ | B23B 51/06 |
| SU | 1276446 A * | 12/1986 | | |
| WO | WO-0067939 A1 * | 11/2000 | ............ | B23B 51/02 |
| WO | WO-03061898 A1 * | 7/2003 | ............ | B23P 15/32 |
| WO | WO-2011132686 A1 * | 10/2011 | ............ | B23B 51/06 |
| WO | WO-2015139680 A2 * | 9/2015 | ............ | B23B 51/02 |
| WO | WO-2017199667 A1 * | 11/2017 | ............ | B23C 5/28 |

* cited by examiner

INTERNAL COOLING PASSAGES FOR ROTATING CUTTING TOOLS

U.S. GOVERNMENT RIGHTS

This invention was made with Government support under contract LIFT007B-1 awarded by the United States Department of Energy. The government has certain rights in this invention.

BACKGROUND

The present disclosure is directed to supplying coolant to cutting tools that comprise internal cooling channels equipped to transport coolant to the cutting edge for end mills or drill tips for drills. Particularly, the disclosure presents a cooling channel that incorporates a cross-section with an elongated shape.

Machining metals and similar materials, can require cutting fluids applied to the cutting area to suppress the high cutting temperature and lubricate tool-chip contact interface. Traditionally these fluids have been applied by various nozzles. It becomes more common to supply high pressure fluids through the tool, which is also referred to coolant through. Certain coolant-through cutting tools, such as milling cutters, drills and reamers, utilize circular (cross section) shaped channels to deliver fluid from the tool shank to the cutting area.

These state-of-the-art cooling passage designs have a variety of shortcomings. Current cooling channel design has ineffective cooling due to the relatively low heat transfer coefficients associated with cooling outside of the nucleate boiling region of the coolants utilized. The location and circular shape cross-section of current cooling channels do not provide effective cooling to the tool cutting edges where it is most required. Moreover, multi-axis milling centers require fluid pumps that consume high energy levels to deliver a large amount of coolant at high pressure.

What is needed is an improved cooling channel with a cross-section that delivers coolant into regions that are the hottest.

SUMMARY

In accordance with the present disclosure, there is provided a cutting tool comprising a tool body comprising a shank and a cutter opposite the shank, the tool body defining a length from a shank end to an end face opposite the shank end, a central axis extends along the length of the body; at least one tooth having a cutting edge, the cutting edge extending along the tooth from the shank to the end face; a flute formed adjacent the at least one tooth; at least one cooling channel formed in the tooth proximate the at least one cutting edge, the at least one cooling channel having an elongated cross sectional shape with an elliptical portion and a circular portion opposite the elliptical portion, wherein the elliptical portion is located proximate the cutting edge.

In another and alternative embodiment, the at least one cooling channel comprises a major axis aligned with a direction of resultant cutting force of the at least one cutting edge.

In another and alternative embodiment, the elongated cross sectional shape is configured to rout a liquid coolant toward the elliptical portion proximate the cutting edge from the circular portion.

In another and alternative embodiment, the at least one cooling channel is configured such that a centrifugal force propels the liquid coolant into the elliptical portion.

In another and alternative embodiment, the centrifugal force is aligned tangential to a flow direction of the liquid coolant within the at least one cooling channel.

In another and alternative embodiment, the elongated cross sectional shape of the at least one cooling channel is configured to maintain a liquid coolant within a nucleate boiling region.

In another and alternative embodiment, the elongated cross sectional shape of the at least one cooling channel is configured to force a liquid coolant toward a hottest portion of the tooth proximate the cutting edge.

In another and alternative embodiment, the liquid coolant is selected from the group consisting of water, nitrogen, carbon dioxide, and ammonia.

In another and alternative embodiment, the at least one cooling channel extends through the body from the shank end to the end face.

In another and alternative embodiment, the at least one cooling channel extends to a cooling channel outlet at the end face.

In another and alternative embodiment, the at least one cooling channel is configured as an open system, such that the coolant exits the cooling channel outlet.

In another and alternative embodiment, the at least one cooling channel is configured as a closed system, such that the coolant is supplied from the shank end proximate to the end face and returns to the shank end within the tool body.

In another and alternative embodiment, the tool body comprises a central return cooling channel configured to carry coolant from the end face to the shank end.

In another and alternative embodiment, the elongated cross sectional shape and location is configured to rout a liquid coolant toward the elliptical portion proximate the cutting edge in which the coolant has vaporized.

In accordance with the present disclosure, there is provided a process for cooling a cutting tool comprising providing a tool body comprising a shank with a shank end and a cutter opposite the shank, the cutter defining an end face; at least one tooth having a cutting edge, the cutting edge extending along the tooth from the shank to the end face; at least one cooling channel formed in the tooth proximate the at least one cutting edge, the at least one cooling channel having an elongated cross sectional shape with an elliptical portion and a circular portion opposite the elliptical portion, wherein the elliptical portion is located proximate the cutting edge; flowing a liquid coolant through the at least one cooling channel; and routing the liquid coolant within the elongated cross sectional shape from the circular portion toward the elliptical portion proximate the cutting edge.

In another and alternative embodiment, process further comprises propelling the liquid coolant with a centrifugal force into the elliptical portion of the at least one cooling channel.

In another and alternative embodiment, the centrifugal force is aligned tangential to a flow direction of the liquid coolant within the at least one cooling channel.

In another and alternative embodiment, the process further comprises maintaining the liquid coolant within a nucleate boiling region by use of the elongated cross sectional shape of the at least one cooling channel.

In another and alternative embodiment, the process further comprises forcing a liquid coolant toward a hottest portion of the tooth by employing the elongated cross sectional shape of the at least one cooling channel.

In another and alternative embodiment, the process further comprises routing the liquid coolant toward the elliptical portion in which the coolant has vaporized by locating the elongated cross sectional shape proximate the cutting edge.

Other details of the cutting tool are set forth in the following detailed description and the accompanying drawings wherein like reference numerals depict like elements.

DETAILED DESCRIPTION

Figure 1:
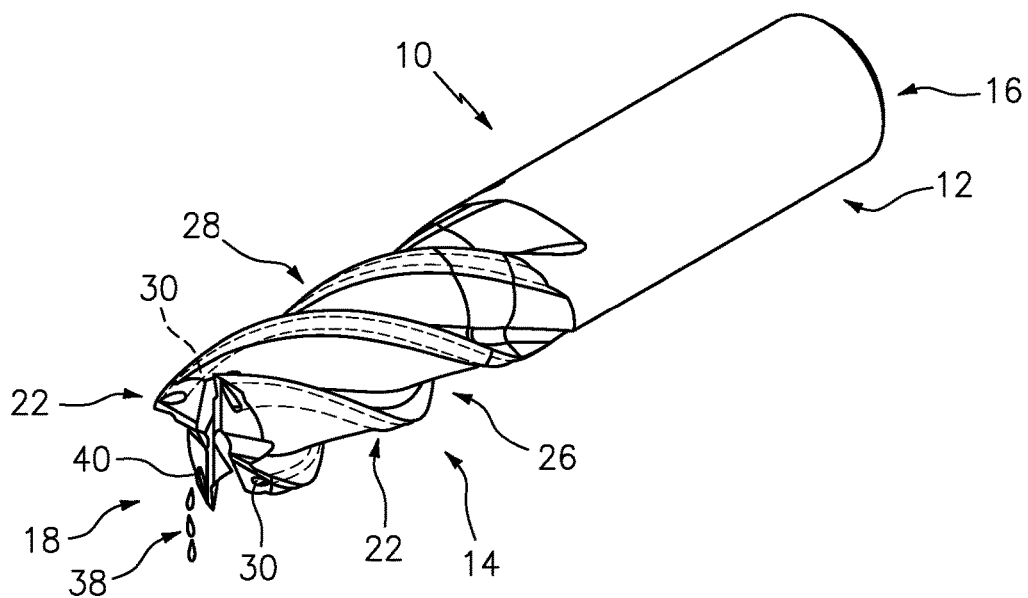
FIG. 1 is an isometric view of an exemplary cutting tool.
Figure 2:
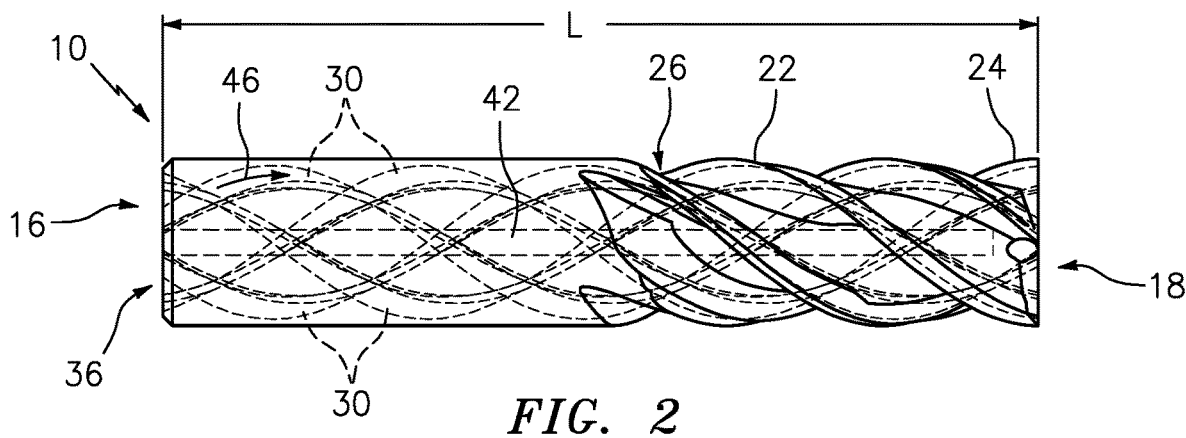
FIG. 2 is a side view of the exemplary cutting tool of FIG. 1.
Figure 3:
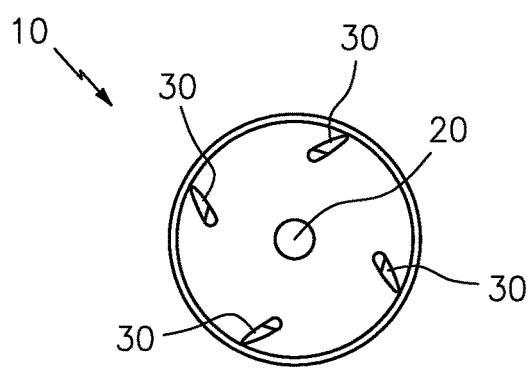
FIG. 3 is a top view of the exemplary cutting tool of FIG. 1.
Figure 4:
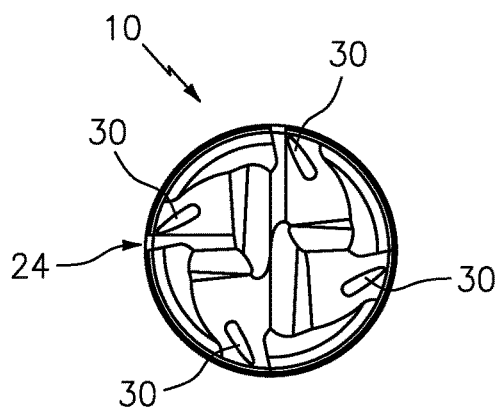
FIG. 4 is a bottom view of the exemplary cutting tool of FIG. 1.
Figure 5:
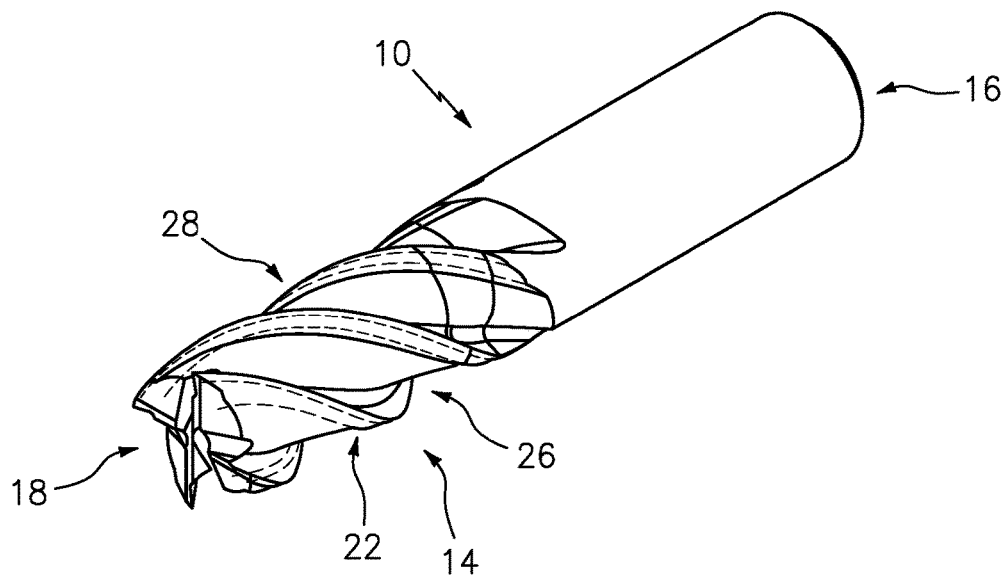
FIG. 5 is an isometric view of an exemplary cutting tool with a closed cooling system.
Figure 6:
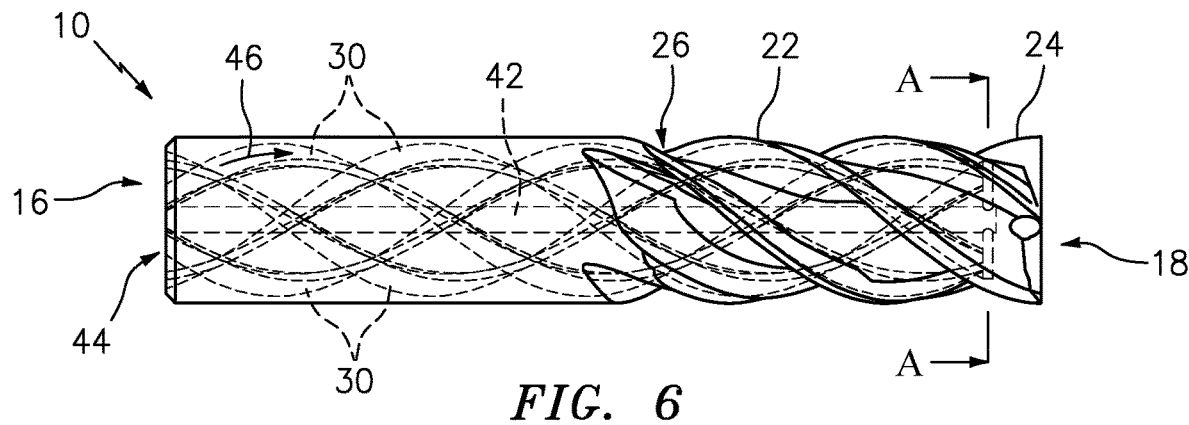
FIG. 6 is a side view of the exemplary cutting tool of FIG. 5.
Figure 7:
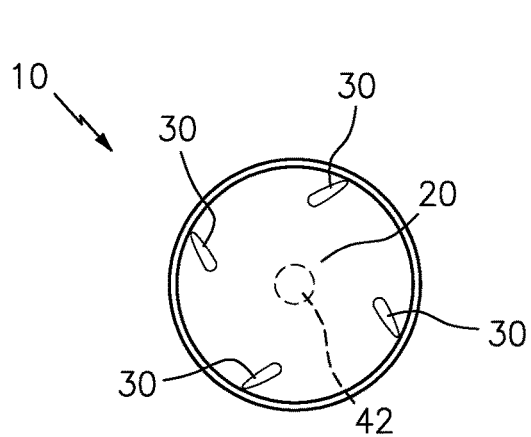
FIG. 7 is a top view of the exemplary cutting tool of FIG. 5.
Figure 8:
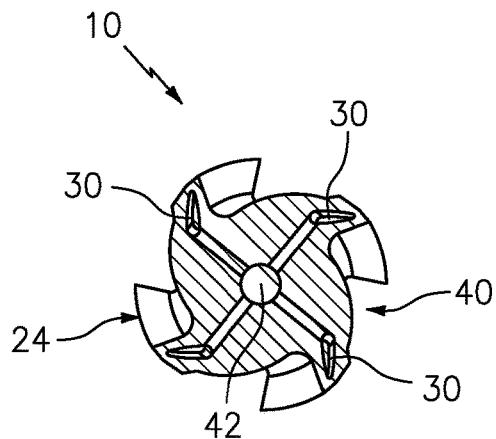
FIG. 8 is a section view A-A of the exemplary cutting tool of FIG. 5.
Figure 9:
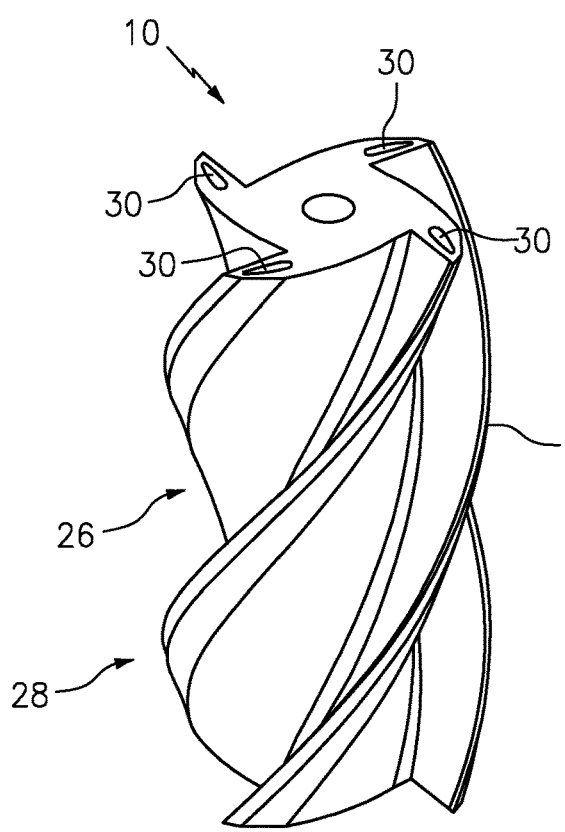
FIG. 9 is a schematic diagram of an exemplary cutting tool.
Figure 10:
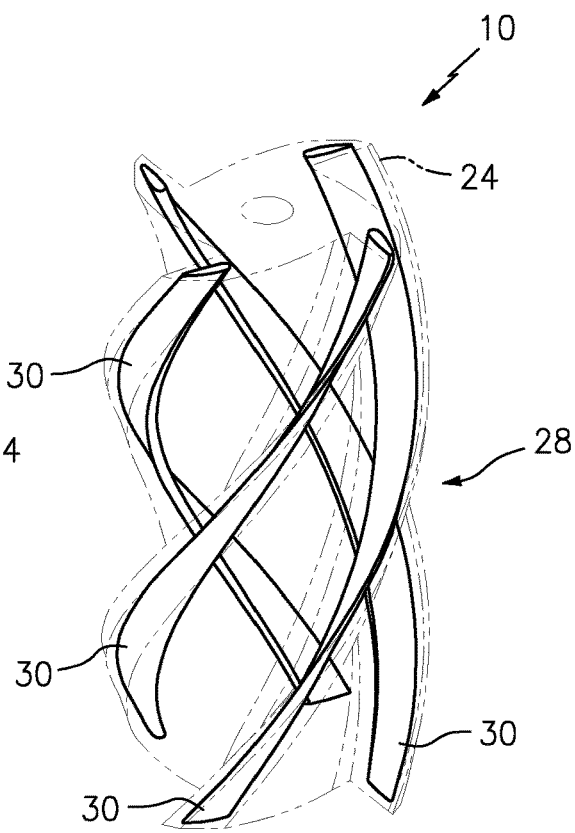
FIG. 10 is a schematic diagram of exemplary cooling channels within the exemplary cutting tool shown in FIG. 9.
Figure 11:
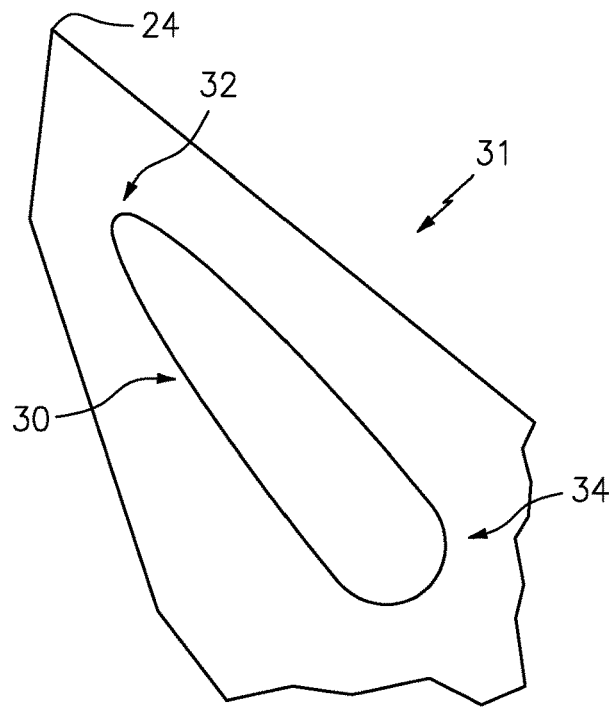
FIG. 11 is a cross-section of an exemplary cooling channel.

Referring to FIGS. 1 through 8, there is illustrated an exemplary cutting tool 10. A tool body 10 includes a shank 12 and a cutter 14 opposite the shank 12. The tool body 10 defines a length L from a shank end 16 to an end face 18 opposite the shank end 16. A central axis 20 extends along the length of the tool body 10.

The tool body 10 includes a tooth 22 having a cutting edge 24. The cutting edge 24 extends along the tooth 22 from the shank 12 to the end face 18. There can be multiple sets of the tooth 22, such as sets of 2, 3 or 4 of the cutting tooth 22. A flute 26 is associated with the tooth 22 and extends along the tool body 10 up to the shank 12. The shank 12 is the cylindrical non-fluted portion of the tool body 10 used to attach and locate the tool body 10 in a tool holder (not shown). The flutes 26 of the tool body 10 can be the deep helical grooves running up the cutter 14. The cutting edge 24 (sharp blade) along the edge of the flute 26 defines the tooth 22. The tooth 22 cuts the material, and chips (not shown) of this material are pulled up the flute 26 by the rotation of the cutter 14. The flutes 26 along with cutting edge 24 of the tooth 22 can include a helix shape 28 that can have a variety of angles.

Referring also to FIGS. 9-12, the cutting tool 10 includes cooling channels 30 formed within cutting tool body 10. The cooling channels 30 extend along the length of the cutting tool body 10 to deliver coolant 38. The cooling channels 30 are formed in each tooth 22 proximate the cutting edge 24. The cooling channel 30 has an elongated cross sectional shape 31 with an elliptical portion 32 and a circular portion 34 opposite the elliptical portion 32. The elliptical portion 32 is located proximate the cutting edge 24. The elongated cross sectional shape 31 retains the necessary mechanical strength of the cutting edge 24.

The elongated cross sectional shape 31 and the location of the cooling channel 30 relative to the cutting edge 24 are configured to rout a liquid portion of the coolant 38 toward the elliptical portion 32 proximate the cutting edge 24 in which the coolant 38 has already vaporized. The vaporized portion of the coolant 38 is less efficient at removing the thermal energy from the cutting edge 24 than the liquid coolant 38.

In an exemplary embodiment, the cooling channel 30 is configured such that during operation a centrifugal force propels the liquid coolant 38 into the elliptical portion 32 of the cooling channel 30, thus providing superior heat removal in that location. The centrifugal force can be aligned tangential to a flow direction 46 of the liquid coolant 38 within the cooling channel 30. The elongated cross sectional shape of the cooling channel 30 is configured to maintain the liquid coolant 38 within a nucleate boiling region. Maintaining the coolant 38 within the nucleate boiling region improves the heat transfer from the cutting edge 24. The elongated cross sectional shape 31 of the cooling channel 30 is configured to force the liquid coolant 38 toward the hottest portion of the tooth 22, thus maximizing the removal of thermal energy being generated at the cutting edge 24.

The cooling channels 30 shown at FIGS. 1 to 4 are configured as an open system 36. The channels 30 extend through the tool body 10 from the shank end 16 to the end face 18. Coolant 38 flows out of a cooling channel outlet 40 at the end face 18.

As shown in the details at FIGS. 5 to 8, the cooling channels 30 do not extend to the end face 18. The cooling channels 30 are directed to central return cooling channel 42 configured to carry coolant 38 from the area near end face 18 to the shank end 16. The configuration of the cooling channels 30 are part of a closed system 44, such that the coolant 38 is supplied from the shank end 16 proximate to the end face 18 and returns to the shank end 16 within the tool body 10.

The coolant 38 can be selected from the group consisting of water, nitrogen, carbon dioxide, and ammonia. The coolant 38 can include liquid nitrogen, and carbon dioxide, peanut oil and the like. In an exemplary embodiment, the coolant 38 can comprise an energy efficient refrigerant medium, such as ammonia and carbon dioxide.

Figure 12:
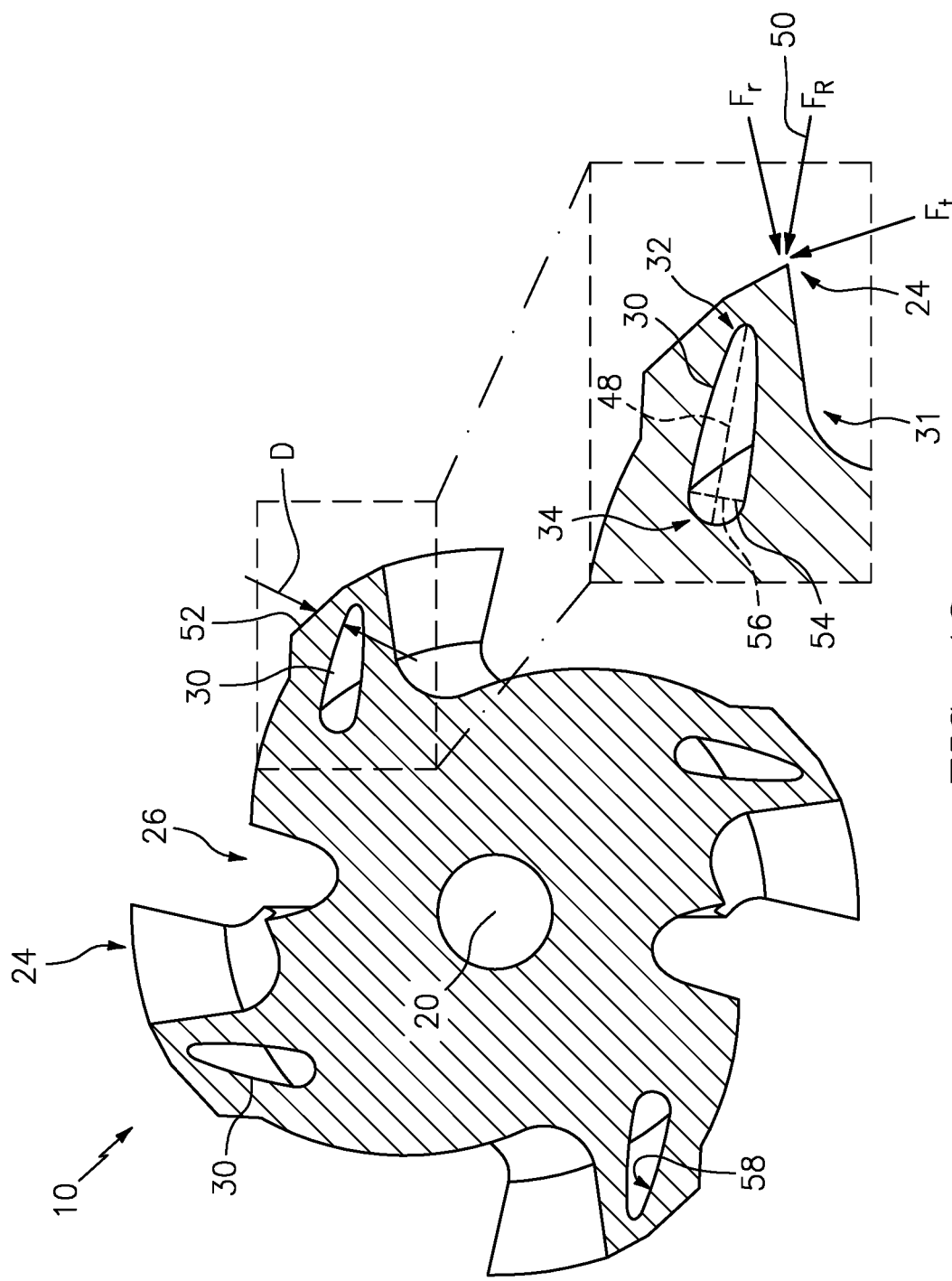
FIG. 12 is a cross-section of an exemplary cutting tool with a cooling channel with an enlarged detailed portion.

As seen in FIG. 12, during machining, cutting forces along the tangential direction $F_t$ and radial direction $F_r$ are applied on the cutting edge 24. The direction of resultant cutting force ($F_R$) 50 on the cutting edge 24 is shown. In an exemplary embodiment the cooling channel 30 is aligned, such that a major axis 48 of the elliptical portion 32 aligns with the direction of the resultant cutting force 50.

In an exemplary embodiment, the cooling channel 30 can be located relative to a cutter outer profile 52 at a distance D. The distance D can be quantified to be about a diameter 54 of the circular portion 34 or the length of a minor axis 56 of the elliptical portion 32.

The area of the elliptical portion 32 can include a ratio between the major axis 48 and the minor axis 56 from about 4 to about 8. The shape and size of the elliptical portion 32 is configured to enlarge a contact area 58 (heat transfer area) between the coolant 38 and the cutter 14 while utilizing the same amount of coolant 38. There are structural/mechanical limits to how large the contact area 58 can be, before the strength of the cutting edge 24 is reduced to below acceptable limits.

A technical advantage of the shape and location of the disclosed cooling channel includes increased heat transfer rates, and thus greater material removal rates because the high cutting speeds can be used due to the effective cooling for difficult-to-machine alloys.

Another technical advantage of the shape and location of the disclosed cooling channel includes lower cost and higher productivity.

Another technical advantage of the shape and location of the disclosed cooling channel includes the need for fewer cutting machines (lower capital investment).

Another technical advantage of the shape and location of the disclosed cooling channel results in reduced energy consumption for coolant delivery and mist collectors.

Another technical advantage of the shape and location of the disclosed cooling channel includes an estimated reduction of energy consumption of up to 50% per manufacturing unit related directly and indirectly to the lack of having to produce the holistic modeling on optimal amounts of coolant needed for production.

Another technical advantage of the shape and location of the disclosed cooling channel is an estimated reduction of 50% of power consumption in non-optimized facilities.

Another technical advantage of the shape and location of the disclosed cooling channel can result in reduced usage and reduced waste of coolant, helping to ensure a more environmentally benign process.

Another technical advantage of the shape and location of the disclosed cooling channel can result in improved tool life and machined surfaces due to the minimization of thermal shock from the machining process.

There has been provided a cutting tool. While the cutting tool has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A cutting tool comprising:
   a tool body comprising a shank and a cutter opposite said shank, said tool body defining a length from a shank end to an end face opposite said shank end, a central axis extends along said length of said body;
   at least one tooth having a cutting edge, said cutting edge extending along said tooth from said shank to said end face;
   a flute formed adjacent said at least one tooth; and
   at least one cooling channel formed in said tooth proximate said at least one cutting edge, said at least one cooling channel having an elongated cross sectional shape with an elliptical portion and a circular portion opposite said elliptical portion, wherein said elliptical portion is located proximate said cutting edge; wherein said at least one cooling channel comprises a major axis aligned with a direction of resultant cutting force of said cutting edge.

2. The cutting tool according to claim 1, wherein said elongated cross sectional shape is configured to rout a liquid coolant toward said elliptical portion proximate said cutting edge from said circular portion.

3. The cutting tool according to claim 2, wherein said at least one cooling channel is configured such that a centrifugal force propels said liquid coolant into said elliptical portion.

4. The cutting tool according to claim 3, wherein said centrifugal force is aligned tangential to a flow direction of said liquid coolant within said at least one cooling channel.

5. The cutting tool according to claim 1, wherein said elongated cross sectional shape of said at least one cooling channel is configured to maintain a liquid coolant within a nucleate boiling region.

6. The cutting tool according to claim 1, wherein said elongated cross sectional shape of said at least one cooling channel is configured to force a liquid coolant toward a hottest portion of said tooth proximate said cutting edge.

7. The cutting tool according to claim 6, wherein said liquid coolant is selected from the group consisting of water, nitrogen, carbon dioxide, and ammonia.

8. The cutting tool according to claim 1, wherein said at least one cooling channel extends through said body from said shank end to said end face.

9. The cutting tool according to claim 1, wherein said at least one cooling channel extends to a cooling channel outlet at said end face.

10. The cutting tool according to claim 9, wherein said at least one cooling channel is configured as an open system, such that said coolant exits said cooling channel outlet.

11. The cutting tool according to claim 9, wherein said at least one cooling channel is configured as a closed system, such that said coolant is supplied from said shank end proximate to said end face and returns to said shank end within said tool body.

12. The cutting tool according to claim 11, wherein said tool body comprises a central return cooling channel configured to carry coolant from said end face to said shank end.

13. The cutting tool according to claim 1, wherein said elongated cross sectional shape and location is configured to rout a liquid coolant toward said elliptical portion proximate said cutting edge in which said coolant has vaporized.

14. A process for cooling a cutting tool comprising:
   providing a tool body comprising a shank with a shank end and a cutter opposite said shank, said cutter defining an end face;
   at least one tooth having a cutting edge, said cutting edge extending along said tooth from said shank to said end face;
   at least one cooling channel formed in said tooth proximate said at least one cutting edge, said at least one cooling channel having an elongated cross sectional shape with an elliptical portion and a circular portion opposite said elliptical portion, wherein said elliptical portion is located proximate said cutting edge;
   flowing a liquid coolant through said at least one cooling channel; and
   routing said liquid coolant within said elongated cross sectional shape from said circular portion toward said elliptical portion proximate said cutting edge.

15. The process of claim 14, further comprising:
   propelling said liquid coolant with a centrifugal force into said elliptical portion of said at least one cooling channel.

16. The process of claim 15, wherein said centrifugal force is aligned tangential to a flow direction of said liquid coolant within said at least one cooling channel.

17. The process of claim 14, further comprising:
   maintaining said a liquid coolant within a nucleate boiling region by use of said elongated cross sectional shape of said at least one cooling channel.

18. The process of claim 14, further comprising:
forcing a liquid coolant toward a hottest portion of said tooth by employing said elongated cross sectional shape of said at least one cooling channel.

19. The process of claim 18, further comprising:
routing said liquid coolant toward said elliptical portion in which said coolant has vaporized by locating said elongated cross sectional shape proximate said cutting edge.

* * * * *